United States Patent

[11] 3,589,166

| [72] | Inventors | Kenneth K. Klar<br>Cuyahoga Falls;<br>Conley Lee, Stow, both of Ohio |
|---|---|---|
| [21] | Appl. No. | 818,509 |
| [22] | Filed | Apr. 23, 1969 |
| [45] | Patented | June 29, 1971 |
| [73] | Assignee | The Goodyear Tire & Rubber Company<br>Akron, Ohio |

[54] METHOD AND APPARATUS FOR TESTING A MODULUS OF AN ELASTOMER
12 Claims, 5 Drawing Figs.

| [52] | U.S. Cl. | 73/15.6 |
|---|---|---|
| [51] | Int. Cl. | G01n 3/18 |
| [50] | Field of Search | 73/15.4,<br>15.6, 100, 102, 89 |

[56] References Cited
UNITED STATES PATENTS

| 1,208,748 | 12/1916 | Chew | 73/15.6 |
| 2,669,119 | 2/1954 | Dodge | 73/15.6 X |
| 2,966,792 | 1/1961 | Di Pieri | 73/15.6 |
| 3,057,182 | 10/1962 | Hackett | 73/15.6 |
| 3,488,992 | 1/1970 | Veith et al. | 73/15.6 |

*Primary Examiner*—Charles A. Ruehl
*Attorneys*—F. W. Brunner and R. S. Washburn ABSTRACT: Apparatus for and method of molding and curing a sample of uncured, curable elastomer, such as a tire tread forming material to form a test specimen. A multipart mold is closed to mold and cure the specimen, parts of the mold then being relatively movable to deform the cured specimen. Means for measuring the deformation and the associated force and for displaying and/or recording the deformation force.

The foregoing abstract is not to be taken as limiting the invention of this application, and in order to understand the full nature and extent of the technical disclosure of this application, reference must be made to the accompanying drawings and the following detailed description.

PATENTED JUN 29 1971

3,589,166

INVENTORS
KENNETH K. KLAR
LEE CONLEY

BY R. Washburn
AGENT

INVENTORS
KENNETH K. KLAR
LEE CONLEY
BY R.W.Washburn
AGENT

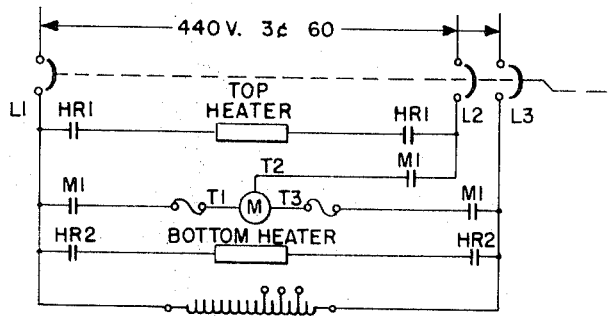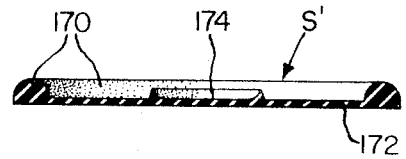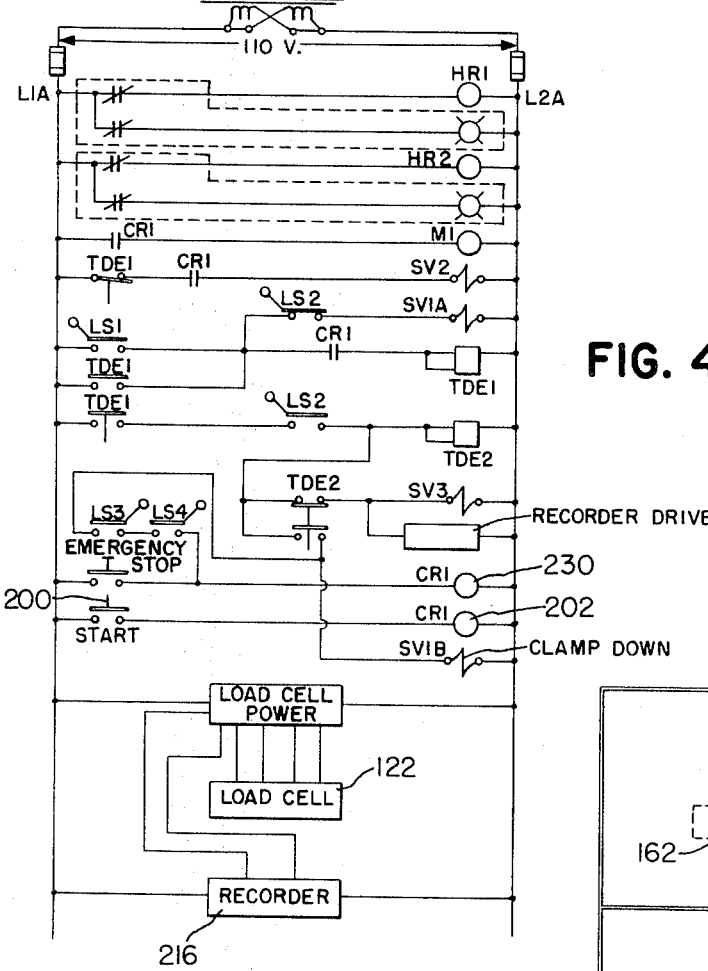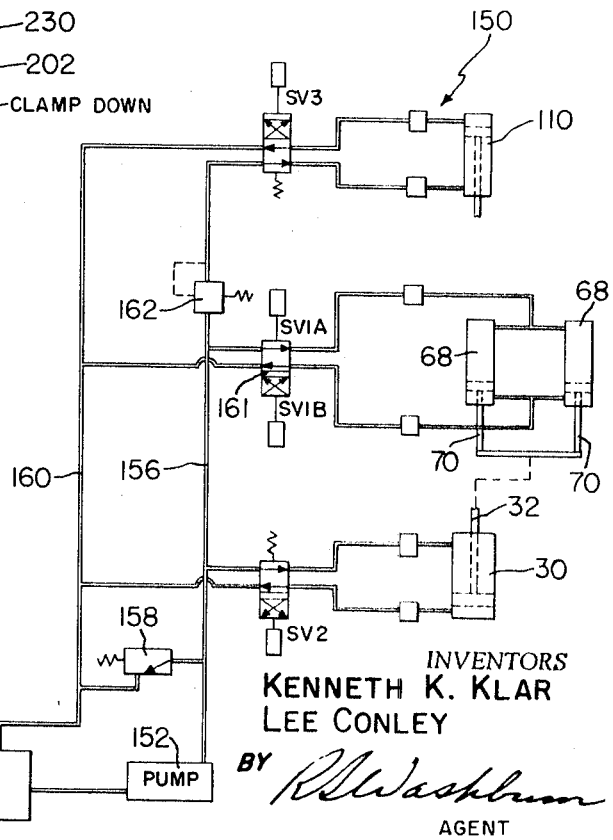
FIG. 5
FIG. 4
FIG. 3
INVENTORS
KENNETH K. KLAR
LEE CONLEY
BY R.D. Washburn
AGENT

METHOD AND APPARATUS FOR TESTING A MODULUS OF AN ELASTOMER

The present invention relates to methods and apparatus for testing physical properties of curable elastomeric materials and particularly to methods for molding and curing a sample or specimen of curable elastomer, such as a tire tread material, and immediately determining or evaluating a property, such as a stress-strain modulus, of the so-cured material. The invention further comprises apparatus for practicing the method.

It is a principal object of the present invention to provide at least comparative measurement of a physical property, such as a stress-strain modulus of the material, which measurement is made immediately and conveniently available for the control of quality of an elastomeric product in its uncured state.

A further object of the invention is to provide for molding and curing a test sample to form a specimen of a predetermined size and shape and for testing a physical property of the specimen while the specimen remains in engagement with the mold in which it is cured so as to improve the accuracy and repeatability of the test results by minimizing or eliminating effects of variations in time and in handling between a curing operation and a physical testing operation.

Another object of the invention is to provide a rapid semiautomatic testing suitable for use in immediate proximity to the production of uncured but curable elastomeric material and to provide a record of the measurement resulting from the test of said property.

Yet another object of the invention is a provision of a specimen shape particularly adapted for comparative testing of the stress-strain relation or modulus of a cured sample of a curable elastomer.

Other objects and advantages of the present invention will become apparent in the following description of a specific illustrative embodiment of the invention and from the annexed drawings in which:

FIG. 3 is a schematic diagram of the fluid pressure system of the apparatus of FIG. 1;

FIG. 4 is a schematic diagram of the electrical system of the apparatus of FIG. 1; and FIG. 5 is a view in cross section of a test specimen according to the invention.

Figure 1:
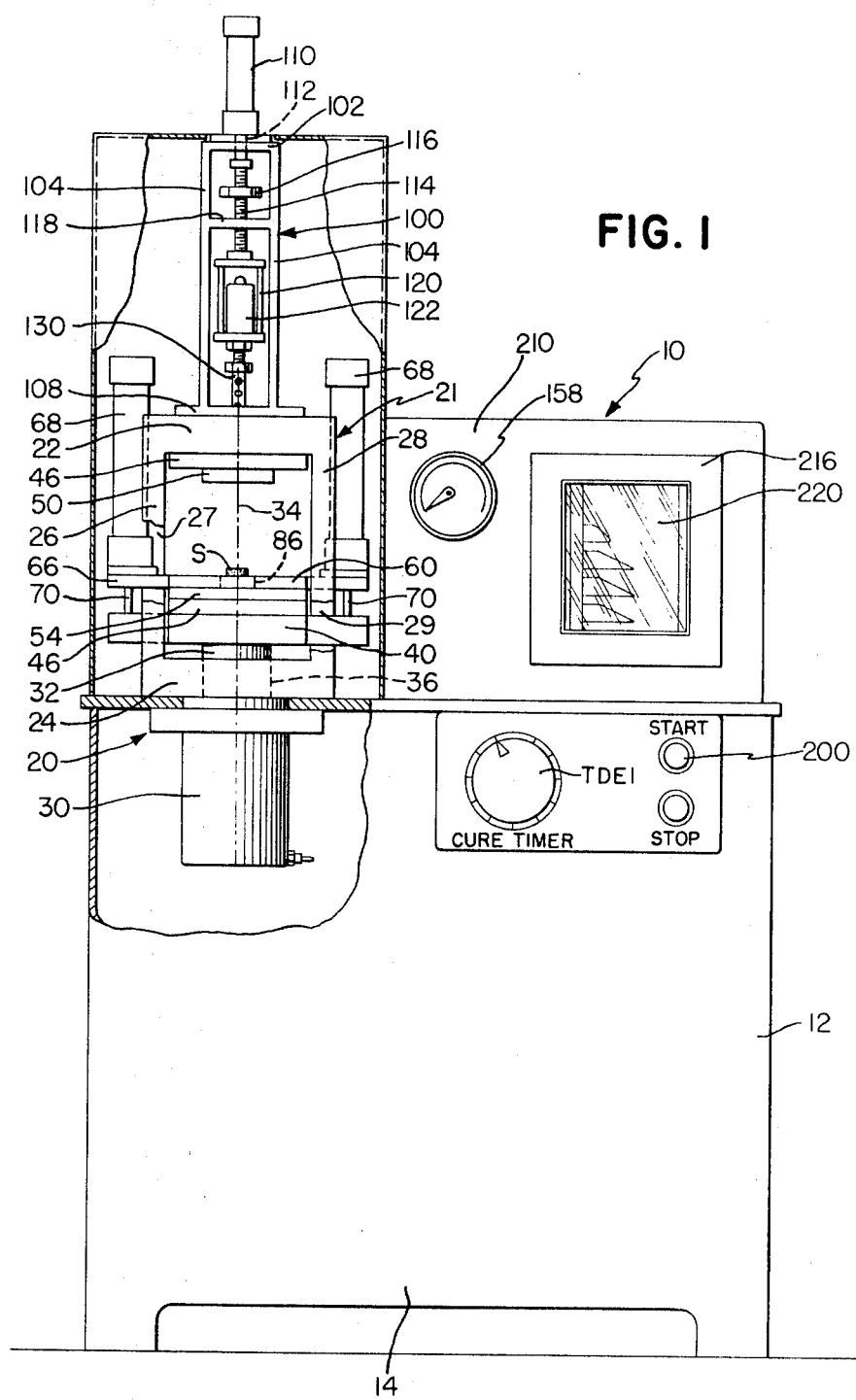
FIG. 1 is a view in front elevation of apparatus according to the invention.

Illustrated in the drawings, particularly FIGS. 1 and 2, an apparatus 10 embodying the present invention comprises a base 12 including an enclosed cabinet 14 in which are housed portions of electric and hydraulic control circuits which will subsequently be described.

Supported upon the base 12, a hydraulic press assembly 20 includes a press frame 21 having generally rectangular upper and lower bedplates 22,24 held securely in spaced parallel relation by front 26,28 and rear 27,29 upright side bar members. Secured to the lower bedplate 24 and extending downwardly therefrom is a hydraulic cylinder 30 having a ram 32 movable along a generally vertical axis 34 of the press assembly through an opening 36 in the lower bedplate 24. Fixed to the upper end of the ram 32 and movable therewith is a press bolster 40 having a generally rectangular plane upper surface 42 disposed perpendicular to the axis of the press, parallel to and facing the opposed lower surface 44 of the upper bedplate 22.

To provide heating means for curing the specimen about to be described, a pair of electrically heated subplates 46 are affixed respectively to the lower surface 44 of the upper bedplate and the upper surface 42 of the bolster 40. Conventional means are provided for regulating the temperature of the subplates, adjustably to a selected temperature, for example, 400° F.

Figure 2:
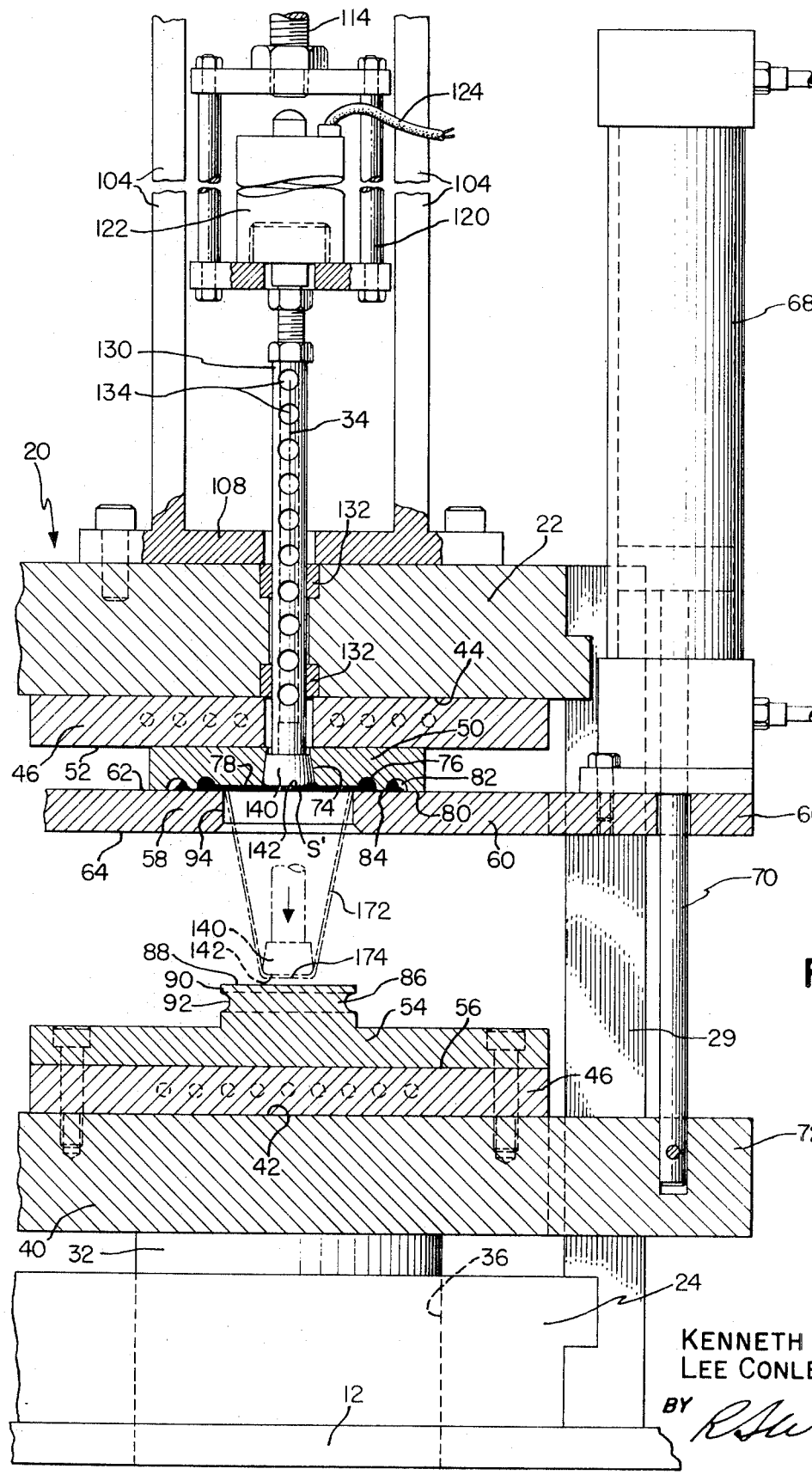
FIG. 2 is an enlarged view in front elevation of a portion of the apparatus of FIG. 1 with parts broken away and parts in section.

Referring now particularly to FIG. 2, the apparatus includes means defining a molding and curing cavity for molding and curing a sample S to provide a specimen S' of a curable elastomer, which means comprises a first or upper mold member 50 fixed coaxially to the lower surface 52 of the subplate and a second or lower mold member 54 fixed coaxially to the upper surface 56 of the lower subplate. The mold means further comprises a third member or middle member 58 carried by or integral with the intermediate plate 60, which may also be provided with heating means.

The intermediate plate 60 has upper 62 and lower 64 surfaces which are parallel to each other and perpendicular with respect to the axis 34 of the press. A pair of lateral extensions 66 of the plate 60 extend outwardly of and between the respective pairs 26, 27, and 28, 29 of sidebars. Secured to the respective lateral extensions 66 and extending upwardly therefrom are a pair of clamp cylinders 68, the respective piston rods 70 of which extend downwardly through openings in the extensions 66 and are respectively attached to the lateral extensions 72 of the bolster 40 which extensions project outwardly between the respective pairs of sidebars.

The upper mold part or member 50 comprises a central bore 74, a concentric annular groove 76, and a plane annular surface 78 extending radially between the bore 74 and the groove 76. The bore is tapered or otherwise enlarged at its end adjacent the surface 78, relative to its upper end. The radially outer wall of the groove 76 terminates in a second annular surface 80, in which a second annular groove 82 is disposed radially outwardly of the first groove, forming a sealing rib 84. The second surface is disposed a small distance above the first annular surface, e.g., a distance of approximately 0.040 inch. As will presently more fully appear the upper surface 62 of the middle mold member 58 cooperates with the upper mold member 50 and particularly the groove 76 thereof to define a first portion of the mold cavity.

The second or lower mold member 54 includes a cylindrical boss 86 having a plane upper surface 88 perpendicular to the mold axis 34, the surface defining a portion of the mold cavity, and a cylindrical wall 90 provided with a relief groove 92 extending circumferentially about the boss and spaced axially downward from its top surface 88. The middle mold member 58 is provided with a generally cylindrical opening 94 extending coaxially therethrough and in which the boss 86 is received. The height of the boss 86 and the thickness of the middle mold member 58 are preferably substantially identical so that when the bottom and middle mold members are fully engaged, the cavity defining surfaces 88 and 62 respectively of the boss and of the middle member are substantially coplanar.

To provide for testing the physical property of the specimen S' while the specimen remains engaged with the mold, the apparatus 10 includes a test assembly 100 mounted on and extending upwardly from the upper bedplate 22 of the press frame 21. The assembly or housing 100 includes a mounting plate 102 carried by a pair of upright side members 104 secured to a base 108 which is bolted to the upper bedplate 22. A test cylinder 110 is affixed to the mounting plate 102, the piston rod 112 thereof being extended movably downward coaxially with the press axis 34. The piston rod end is suitably connected to one end of a threaded rod or shaft 114 on which is mounted a hexagonal clamp nut 116 adjustably fixed thereon to move, with movement of the piston rod 112, between the plate 102 to which the cylinder 110 is attached and an intermediate plate 118 extending between the members 104 of the housing. The position of the nut 116 is adjusted axially along the threaded rod 114 to limit the stroke downward of the piston rod 112 a predetermined distance from approximately 0 to approximately 3 inches of travel. The other end of the shaft 114 is attached to a carrier 120 in which is mounted a load or test cell 122, such as a Revere load cell, Bulletin 3026–2, manufactured by Revere Corporation, div. of Neptune Meter Corporation, Wallingford, Connecticut, which provides means for sensing the amount of force exerted between the specimen S' and the test cylinder 110. Electrical connection between the load cell and its power supply and signal amplifier are provided by flexible electric cable 124 extending from the cell in a manner to avoid any imposition of extraneous loads on the cell. Suitably attached to the armature of the test cell 122 is a plunger 130 extending coaxially downwardly through suitable openings in the plate 102, the upper bedplate 22, and the subplate 46. To provide suitable alignment of the plunger 130 the upper bedplate 22 is provided with guide bushings 132.

To isolate the load cell 122 from heat originating in the press assembly, the plunger 130 is preferably provided with means to dissipate the heat in the form of a multiplicity of holes 134 radially through the tubular wall of the plunger.

Fixed to the lower end of the plunger 130 and lodged within the tapered bore 74 of the upper mold member 50 is a plunger foot or plug 140 the end face 142 of which is engageable with the material forming the specimen and thus provides a portion of the surface of the molding cavity. The plunger foot 140 may be flush with the annular surface 78 or be recessed slightly inwardly therefrom. In either case the end face 142 of the foot, including an annularly rounded edge thereof exposed to the material forming the specimen, provides in the molded specimen S', a central surface portion displaceable, by operation of the test cylinder 110, with respect to another portion of the specimen, specifically the annular edge portion formed by the pair of mold members including the annular groove 76.

Illustrated schematically in FIG. 3, the hydraulic system 150 of the apparatus 10 includes a conventional pump 152 and motor receiving hydraulic fluid from a reservoir 154, and delivering fluid to the pressure line 156 at a pressure regulated by the valve 158. Fluid pressure to raise or lower the ram 32 and the lower mold member 54 supported thereby is controlled by a solenoid-actuated valve SV2 which valve also controls the return of fluid exhausted from the cylinder 30 to the drain line 160. During upward movement of the ram 32 the pistons and rods 70 of the clamp cylinders 68 are forced upwardly, the force of the main ram 32 acting to drive the fluid above the pistons in the clamp cylinders 68 through the valve 161 into the pressure line 156 insuring that the middle member 58 and the bottom member 54 of the mold travel together as a unit during closing movement of the press.

For purposes which will presently be made more fully apparent the pressure line 156 of the hydraulic system delivers fluid under pressure to a test cylinder 110 through a pressure regulator valve 162 and a solenoid-actuated spring return valve SV3.

The invention contemplates in certain of its aspects the selection and comparison of a series of representative samples taken from a continuing production flow of an elastomeric material, such as, for example, a mixture of ingredients including rubber subsequently to be shaped and cured in the form of a tread of a tire. While the invention provides utility in numerous environments which will be apparent to those skilled in the art, it may be considered of particular utility when practiced conveniently adjacent to the facilities for the production of the elastomer the quality of which is desired to be controlled, as for instance, a strip of tread rubber compound proceeding from a feed mill to a tread extruder.

In a preferred mode of operation, a representative sample of an elastomer is taken from the production stream, the quantity of the sample being sufficient at least to fill the cavity previously described. An excess of material as much as 10 percent can be tolerated. The material is, of course, in its uncured state.

Referring now to the drawings and particularly FIG. 1, the sample S is placed on the upper surface 88 of the boss of the bottom mold member, the middle member and intermediate plate being, at the beginning of the test operation, in their lowermost position, the clamp cylinder rods 70 being fully retracted and the top surface 62 of the middle mold member being flush with the top surface 88 of the boss of the bottom part of the mold, as may be seen in FIG. 1. By the apparatus herein described, the sample S is molded to form a test specimen S', illustrated in FIG. 5, having a circular or annular bulbous edge portion 170 and a circular diaphragm or membrane portion 172 of a predetermined thickness, generally about 0.040 inch, bounded by the edge portion. A central portion 174 of the membrane, formed as has been described by its contact with the end face 142 of the pressure foot 140 may be slightly increased in thickness with respect to the thickness of the annular portion 172 lying radially between the center portion 174 and the edge 170.

Referring to FIGS. 2 and 4, with the sample S in place on the surface of the boss, the operation of the apparatus 10 is initiated by the press-button 200, energizing the latch relay 202 and the associated contactors CR1, energizing the motor starter M1 and the solenoid valve SV2, energizing the hydraulic pump 152 drive motor and delivering oil, at a pressure regulated by the regulator 158 on the control panel 210, to elevate the ram 32 and close the mold with the application of pressure sufficient to cause the sample S to flow, filling the mold cavity. Any small excess of sample material is forced by the pressure thereon to flow outward between the surface 80 of the sealing rib 84 and the opposed surface 62 of the middle mold member 58 until the surface of the middle mold member engages the sealing rib. The arrangement insures that the specimen cavity will be completely filled and the material under compression during the curing cycle. However, any small excess which is extruded prior to the complete closure of the cavity will be cured in and readily removed from the second groove 82 surrounding the mold cavity. When the ram 32 reaches its uppermost position, closing the mold cavity fully, limit switch LS1 is actuated, activating the timer TDE1 by which a predetermined cure time, for example, 10 minutes, is preset. The specimen S' is cured for the time selected at the temperature regulated by the means previously referred to. The actuation of the limit switch LS1 also energizes the solenoid valve SVA so that hydraulic fluid at pressure is admitted to the head end above the pistons of the clamp cylinders 68 thereby clamping the middle mold member 58 and the top mold member 50 together for purposes which will presently appear.

At the end of the time period for which the time delay TD1 has been set, solenoid valve SV2 is deenergized, positioning the valve to admit pressurized fluid above the piston of the ram 32 and permit the ram to stroke downward, moving the bottom mold member 54 to separate the middle and bottom members from each other, thus exposing the central annular portion 172 of the now cured test specimen S' while a remaining portion thereof, namely the annular edge portion 170, and a small annular portion of the membrane immediately adjacent to the edge, is held by the upper pair, namely the top member 50 and middle member 58 of the mold, which latter are held in engagement by the fluid pressure above the pistons of the clamp cylinders.

When the ram 32 reaches its lower position a limit switch LS2 makes contact actuating the test timer TDE2 and energizing the solenoid valve SV3, as well as the chart drive of the recorder 216. The recorder 216 is conventional and may be obtained commercially from Leeds and Northrup, requiring that the recorder be adapted to cooperate with the load cell chosen.

Energization of the solenoid valve SV3 admits fluid pressure to the head end of the test cylinder 110 above the piston causing the same to stroke downward, moving the plunger foot 140 transversely or coaxially of the cavity, simultaneously moving the threaded rod 114 and the hexagon clamp nut 116 downward the preset distance into engagement with the transverse member 118. The specimen is thereby deformed, displacing the central portion 174 of the membrane 172 with respect to the edge portion 170 in a direction perpendicular to the edge portion by the preselected amount or distance such that the specimen S' is deformed an amount determined by the setting of the clamp nut. Displacement of the central portion 174 of the specimen elastically deforms the annular portion 172 into the frustoconical form as generally illustrated in FIG. 2, so that a resisting force proportional to the deformation in the specimen S' is communicated between the test cylinder and the specimen and is sensed by the previously described load cell 122 which generates a signal which is an analog of the amount of force applied and communicates that signal to the recorder 216 where a representation of the force is displayed on the chart 220. Representation of the force may alternatively be displayed by a suitable galvanometer. Generally, the force responsive to the displacement of the center portion of the specimen with respect to the edge portion will represent a stress-strain relation or modulus useful for quality control of the stream of elastomer being produced.

At the end of the time period preset in the timer TDE2, for example, 30 seconds, the solenoid valve SV3 and the recorder drive are deenergized, causing the plunger 130 to retract axially upward lodging the pressure foot 140 again in the bore 74 of the top mold member. Solenoid valve SV1B is energized admitting pressurized fluid to the clamp cylinder 68 rod end, causing the cylinders to move the middle mold member 58 down to its starting position and engagement with the bottom part of the mold, thereby releasing the specimen for removal from the apparatus. Upon completion of movement of the middle mold member downward and of the test cylinder plunger 130 up, limit switches LS3 and LS4 are actuated, completing the circuit to the unlatch relay 230 stopping the pump drive motor and resetting both timers TDE1 and TDE2, thus restoring the apparatus to starting condition.

In normal use the circuit containing the top heater and the bottom heater which are respectively associated with the heated subplates 46 previously referred to remains closed so that the mold is kept at its preferred temperature ready for molding and curing a next specimen.

The foregoing description will make apparent to those skilled in the art advantages provided by the invention. In particular, a sample of elastomer may be placed in the machine and an indicative property characterizing the quality of the elastomer is determined immediately, the results being available in a minimum time for corrective action. A further advantage resides in the fact that the sample of uncured elastomer is quickly cured and immediately tested without intermediate handling or the inaccuracies resulting from variances in temperature, cooling time, and diversities of shape, size, and surface condition of the sample. The results of the test, namely a stress-strain relation or modulus of the elastomer in its cured condition is obtained and recorded prior to the time at which the product being made is finally cured and available for testing. It will also be apparent that the invention can be practiced with advantage with the particular shape of specimen described herein or with a specimen of a shape adapted to be deformed or stressed along the same or along different axes.

Moreover, the particular specimen shape disclosed is removed, fully cured, from the mold described herein and may be tested or retested to determine a stress-strain relation or other physical property independently of the apparatus described herein. It should further be noted that the stress-strain determination contemplated by the invention differs completely in concept from the well-known Mullin test in which a sample of sheet material is strained to destruction by application of force transverse to the plane of the material. The distension or deflection of a specimen according to the present invention, as has been indicated hereinabove, leaves the specimen intact and substantially undamaged.

While certain representative embodiments and details have been shown for the purpose of illustrating the invention, it will be apparent to those skilled in the art that various changes and modifications may be made therein without departing from the spirit or scope of the invention.

What we claim is:

1. Apparatus for testing a physical property of a curable elastomer in the cured state thereof comprising a specimen curing mold cavity having heating means associated in heat transfer relation therewith and including first means operable to define a first portion of said cavity, second means operable to define a second portion of said cavity connected with said first portion, and means connected to said second means for effecting a predetermined movement of said second means and of the corresponding portion of said specimen cured in surface contact therewith relatively with respect to said first means through and outwardly of said cavity while remaining portions of said specimen continue to be engaged by said first and second means.

2. Apparatus as claimed in claim 1, said first means comprising a first pair of mold cavity defining members relatively movable between a molding position wherein said first cavity portion is defined and a separated position, said second means comprising a second pair of mold cavity defining members movable relatively of each other and of said first pair between a mold closed position wherein said first and second pairs cooperate to mold and cure said specimen, one of said second pairs of members being movable away from its said closed position while said first pair remain in their said molding position, the other of said second pair being movable transversely of the first said pair and through said cavity.

3. Apparatus for curing a sample of a curable elastomer in the form of a test specimen and for testing a physical property of the cured specimen, comprising a press having a frame, a ram mounted in and movable axially of said frame, a first mold member mounted fixedly on said frame and having a surface defining a first portion of a specimen molding cavity, a second mold member mounted on said ram for movement therewith toward and away from said first member and having a surface defining a second portion of said cavity, a third mold member having a surface defining a third portion of said cavity opposed to said first portion and mounted for movement relatively of each and between said first member and second member, and clamping means movable with said ram for moving said third mold member to a cooperative opposed molding engagement with said first member to mold and to retain a portion of said specimen therebetween and to engagement with said second member during movement of said ram and said second member toward said first member to close the said cavity.

4. Apparatus as claimed in claim 3, said first mold member having an opening therethrough, means movable through said opening including a plug adapted to close said opening and having a surface forming a portion of said cavity, and means operable to move said plug relatively of said first mold member to deform a portion of said specimen while the same is retained between said first member and said third member.

5. Apparatus as claimed in claim 4, including force sensing means connected to said plug and capable of emitting a signal responsive to the force between said plug and said specimen when said specimen is deformed a predetermined distance by said plug.

6. Apparatus as claimed in claim 5, comprising means connected to said sensing means and capable of displaying a representation of the force sensed by the sensing means.

7. Apparatus as claimed in claim 4, said means movable through said opening being drivingly connected to fluid power cylinder mounted coaxially of said frame and having means for adjustably limiting the specimen deforming movement of said plug.

8. Apparatus as claimed in claim 3, said apparatus including heating means in heat transferring relation with at least one of said mold members, and timing means operable to open said mold at the end of a predetermined curing time.

9. Apparatus for curing and testing a stress-strain modulus in the cured state of a curable elastomer comprising means providing an axisymmetric specimen molding and curing cavity including a first mold member having a plane annular surface terminating outwardly in an annular recess depressed with respect to said annular surface and having a second annular surface outwardly of and concentric with said recess and elevated with respect to the first said annular surface, a second mold member having a plane annular surface spaced form the first said annular surface to mold therebetween an annular membrane portion of said specimen, a third mold member having a plane annular surface engaging said second annular surface and cooperating with said recess to mold an annular edge portion of said specimen, at least one of said members having heating means associated therewith, means including a ram movable coaxially of said cavity for providing relative movement of one of the first and second members between a mold closed position and a separated position, means including a pair of rams movable parallel to the axis of said cavity for providing relative movement of the third member between cooperative engagement with said first member and cooperative engagement with said second member, the first said member having an opening extending coaxially therethrough, means including a plug received in said opening and having an end face engageable with a specimen to mold a central portion thereof, said plug being movable transversely of said cavity while said first and second members are in their separated position and said first and third members are in their closed position to displace a central portion of said specimen with respect to the edge portion thereof, the last mentioned means including means for exerting a force on said plug, means operatively connected to said last mentioned means for sensing the amount of at least one of said force and the displacement of said plug, and means displaying a representation of said amount so sensed whereby the said modulus can be evaluated.

10. A method of testing a stress-strain modulus of a cured specimen of a curable elastomeric material comprising curing said specimen in a mold having plural members, said specimen being a circular membrane having a bulbous annular edge secured between rigid members of said mold, displacing a central portion of said membrane relative to said edge in a direction transverse to the plane of said edge while the same remains so secured, and determining the amount of at least one of the displacement and the force associated with said displacement.

11. The method of testing a physical property in the cured state of a curable elastomer comprising, curing a sample of uncured curable elastomer in a multipart heated mold to provide a specimen in said cured state, and then displacing at least one part of said mold and of said specimen relative to other parts of the mold through and outwardly of said cavity while said specimen remains engaged by at least two other parts of said mold.

12. The method of testing a physical property in the cured state of a curable elastomer comprising molding a sample of said material to form a test specimen having a circular edge portion, a center portion concentric with said edge portion and an annular membrane portion of generally uniform thickness extending radially between said central portion and said edge portion, curing said specimen by heating the same for a predetermined time in a compressed state within a molding cavity having at least two mold cavity forming members at least one of which is movable with respect to said cavity, moving a movable one of said members and deforming said specimen by displacing said central portion with respect to said edge portion in a direction perpendicular to said edge portion, sensing the amount of at least one of the deformation of said specimen and the force exerted by said specimen while the same is deformed whereby a stress-strain modulus of said elastomer in the cured state thereof can be measured.